(12) United States Patent
Fleischer et al.

(10) Patent No.: US 6,649,898 B1
(45) Date of Patent: Nov. 18, 2003

(54) METHOD AND APPARATUS FOR OPTICALLY ENABLING A CIRCUIT COMPONENT IN A LARGE SCALE INTEGRATED CIRCUIT

(75) Inventors: Siegfried Fleischer, Santa Clara, CA (US); Dean Samara-Rubio, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 09/608,732

(22) Filed: Jun. 30, 2000

(51) Int. Cl.[7] ............................................. H01L 31/00
(52) U.S. Cl. ................................. 250/214 R; 257/80
(58) Field of Search ....................... 250/214 LS, 214 A, 250/214 LA, 214 R; 340/555, 556, 557; 257/80, 81, 82, 431

(56) References Cited

U.S. PATENT DOCUMENTS

| | | | | |
|---|---|---|---|---|
| 4,359,773 A | * | 11/1982 | Swartz et al. | 331/94.5 M |
| 4,471,494 A | * | 9/1984 | Keil et al. | 455/611 |
| 4,808,811 A | * | 2/1989 | Kumakura et al. | 250/214 L |
| 5,212,685 A | * | 5/1993 | Stilwell, Jr. et al. | 370/31 |
| 5,243,182 A | * | 9/1993 | Murata et al. | 250/222.1 |
| 5,247,382 A | * | 9/1993 | Suzuki | 395/156 |
| 5,589,961 A | * | 12/1996 | Shigete et al. | 349/41 |
| 5,748,303 A | * | 5/1998 | Korta et al. | 356/229 |
| 6,145,874 A | * | 11/2000 | Modzelewski et al. | 280/735 |
| 6,407,468 B1 | * | 6/2002 | LeVesque et al. | 307/10.1 |

* cited by examiner

*Primary Examiner*—Edward J. Glick
*Assistant Examiner*—Irakli Kiknadze
(74) *Attorney, Agent, or Firm*—Blakely, Sokoloff, Taylor & Zafman LLP

(57) ABSTRACT

According to the invention, systems, apparatus and methods are disclosed for optically enabling a circuit component in a large scale integrated circuit. In one embodiment, the invention is a circuit comprising a light sensing device for producing a signal in response to sensing light, an optic function subcircuit, and a switch connected to the light sensing device and to the optic function subcircuit for activating the optic function subcircuit when light is sensed. The light sensing device is preferably a phototransistor and a light sensing circuit is preferably placed between the light sensing device and the switch for amplifying and conditioning the light sensing signal. The optic function subcircuit can be an optical modulator, an optical receiver or any other device that is to be operated and powered only when incident light is present. The switch can be a logic gate or a transistor switch coupled to the light sensing device and to an input to the optic function subcircuit, such as a power supply or a clock input, for alternately enabling and disabling the input to the optic function subcircuit.

11 Claims, 3 Drawing Sheets

METHOD AND APPARATUS FOR OPTICALLY ENABLING A CIRCUIT COMPONENT IN A LARGE SCALE INTEGRATED CIRCUIT

FIELD OF THE INVENTION

This invention relates to optical components in large scale integrated circuits in general, and more specifically to activating a circuit component in response to the detection of light at a specified point in the circuit.

BACKGROUND OF THE INVENTION

Optical components provide and can provide many different functions in large scale integrated circuitry. Optical back planes are used to connect several circuit boards to each other. Such back planes require optical modems to communicate between the back plane and the chips on the circuit card. Optical communication between chips on a single card is under development as is optical communications using optic fiber for networking, internet and other communications. It has also been proposed to provide optical input/output ports on microprocessors to allow for testing and other functions. The optical interface circuitry required to support these applications may be used only infrequently and may involve high power consumption components such as analog amplifiers, sample and hold capacitors etc. Accordingly, it is preferred that the circuitry necessary to support the optical communications only be powered when the circuitry is in use. This saves power and reduces heat, which is particularly desirable in a large scale.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
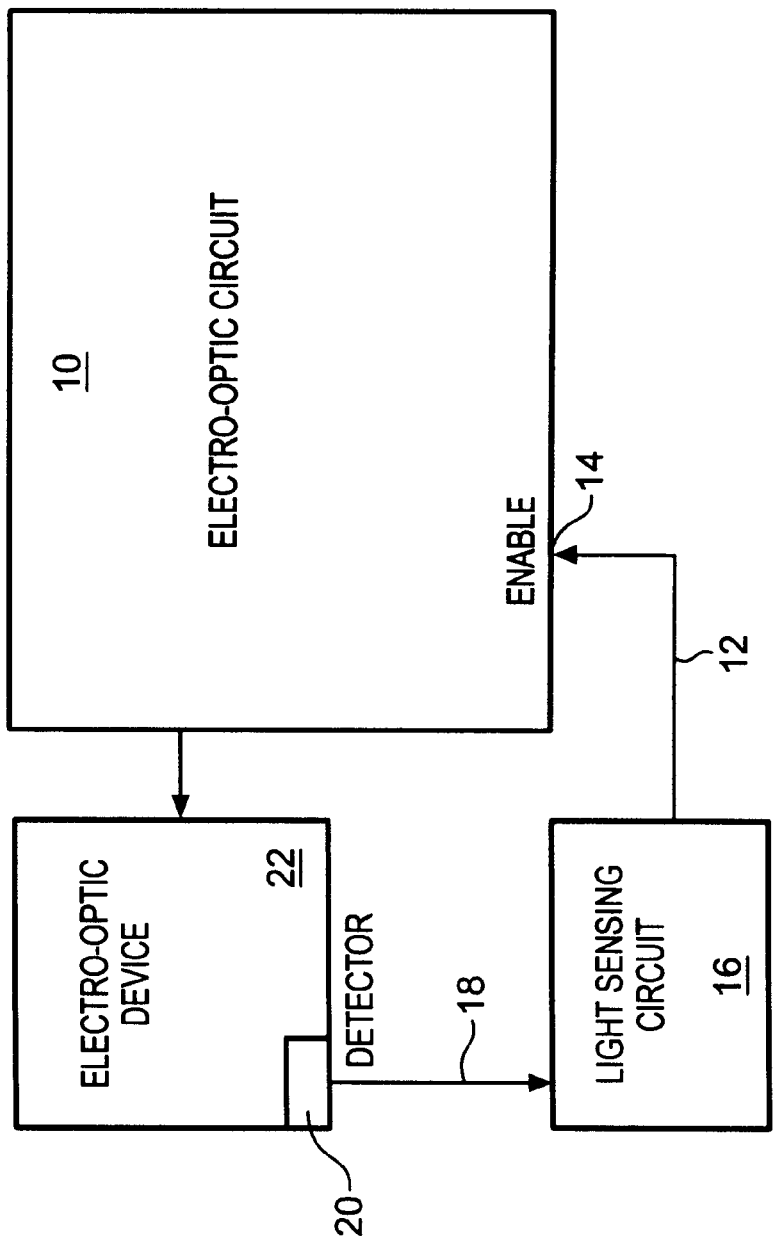
FIG. 1 is a block diagram of the primary features of the invention.

FIG. 1 is a block diagram illustrating the basic ideas behind the present invention. FIG. 1 shows an electro-optic circuit 10. This circuit can be a modulator/demodulator, a diagnostic circuit, or any other type of circuit that utilizes an optical input to accomplish functions. The electro-optic circuit can alternatively be a receiver for receiving an optical clock signal to drive a high accuracy or high speed component. The present invention is best suited to such circuits which are used only occasionally. For example, an optical diagnostic and test circuit is used only for test purposes and not for normal operations. An optical communications circuit is used only when data is sent or received on the optical communications line. The optical clock signal may be provided in addition to an electrical clock signal depending on the performance desired. Alternatively, the invention can be applied to other kinds of circuits that are not related to optical signals in any way except that an optical signal is used to turn the circuit on and off.

The electro-optic circuit is enabled by an enable/power up signal 12 at an enable port 14. The enable/power up signal can act on the clock, power supply or other aspect of the circuit. In any case, the electro-optic circuit operates and consumes power only when the signal is supplied. The electro-optic circuit is connected through its port to a light sensing circuit 16. The light sensing circuit 16 receives a sense signal 18 from a photodetector 20. The photodetector can be provided with, or as part of, an electro-optic device 22. If the photodetector is exposed to light at the appropriate wavelength and with sufficient intensity, it generates the sense signal that is received by the light sensing circuit which in turn enables the power or the clock/data line as appropriate.

Figure 2:
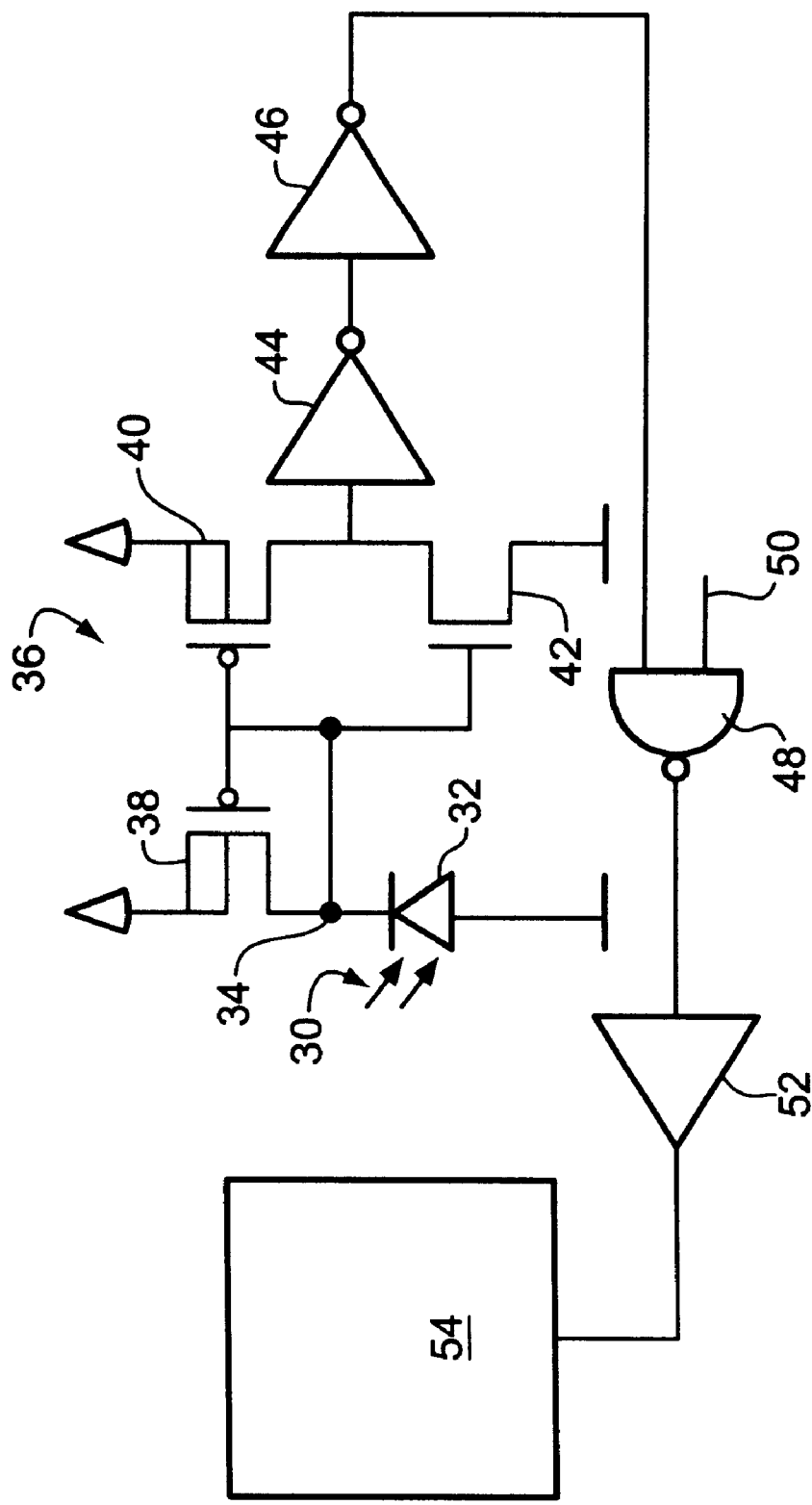
FIG. 2 is a circuit diagram of an application of the present invention to enable an optical modulator.

FIG. 2 shows a circuit for implementing the present invention in CMOS (Complementary Metal Oxide Semiconductor) technology such as is typically used in microprocessors and many other digital large scale integrated circuit chips. It is presently preferred that the present invention be implemented in CMOS on a silicon p-doped substrate, however, the present invention can be applied with equal effect to other types of integrated circuits built from other materials including gallium arsenide and indium phosphide. In FIG. 2, light 30 falls onto a photodetector 32 such as an n-well guard-ring phototransistor or a pn-junction photodiode or any other photodetector known in the art. The phototransistor as a result produces a small bias current at the photodetector node 34. This node is connected to a current mirror 36. The current mirror includes two opposing p-channel CMOS transistors 38, 40 with inverted gates connected to each other and to the photodetector node 34. One side of the mirror is connected to the photodetector node through the drain of one of the transistors and the other side of the mirror is connected to the drain of a long gate length, high capacitance, slow n-channel transistor 42. The gate of the slow transistor is also coupled to the photodetector node. The slow transistor, when switched on by the photodetector provides the current at its drain to an amplifier stage, in this case, two inverters 44, 46.

The slow transistor with its high internal capacitance responds only very slowly to the presence of a current at the photodetector node. This slowness not only prevents accidental triggers from noise and shock, it also prevents accidental shut downs. If the photodetector receives an amplitude modulated light pulse and produces an amplitude modulated current at the photodetector node, then the high capacitance of the slow transistor will smooth the signal and even out the pulsed nature of the photodetector's output. Accordingly, the slow transistor is selected to have a capacitance that creates a response time several times slower than the slowest frequency of a received modulated light signal.

The amplifier stage receives the output of the current mirror, the current between the slow transistor's drain and one side of the mirror's source to which it is connected. This signal is amplified and conditioned for digital processing by the two inverters and connected to an input of an AND logic gate. The current mirror and the amplifier stage together make up the sensing circuit analogous to the sensing circuit 16 shown in FIG. 1. The other input of the gate is coupled to a clock/data source 50. Alternatively, it could be coupled to a power supply line. Accordingly, when the sensing circuit produces a high output, the clock/data or power supply is switched on. This signal is directed to an amplifier 52 and from there to an electro-optic device 54 which is turned on through the receipt of a clock/data signal or a power/enable signal.

The electro-optic device, as explained above can be any one of several different types of optic function subcircuits on the integrated circuit. In FIG. 2, the optic function subcircuit is preferably an optical modulator. The optical modulator only needs to be driven when an optical signal 30 is present and this signal is detected by the photodetector 32. At other times, the modulator is disabled and does not consume any significant amount of power. Since an optical modulator is typically a high power device with analog amplifiers, capacitors and other high power consumption devices, turning off the modulator can significantly affect the chip's overall power consumption.

In FIG. 2, the photodetector 32 is shown as separate and distinct from the modulator 54. It is preferred that the photodetector be provided on the periphery of the system that provides optical reception and transmission of the modulated optical signal for the modulator, typically another photodetector and luminescent diode. The photodetector can also be placed within the modulator. This approach simplifies the detection circuitry and allows the photodetector 32 to be optimized for its basic function. In addition, the light sensing circuitry is preferably powered continuously so that light may be detected at any time. By keeping the light sensing circuit separate from the optic function circuit, the light sensing circuit can be optimized for minimum power consumption. Alternatively the modulator's photodetector (not shown) can be used instead of the one shown in the drawings or the modulator can receive the optical signals using the photodetector shown in FIG. 2.

Figure 3:
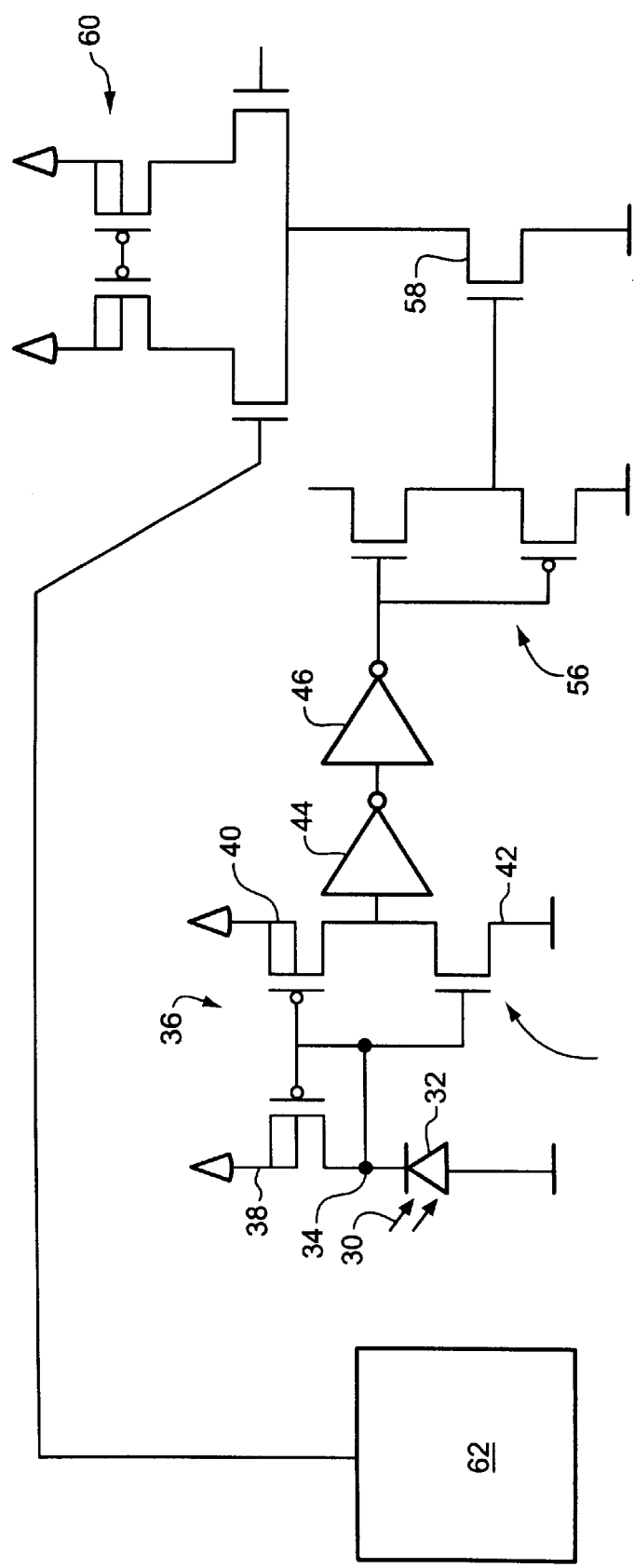
FIG. 3 is a circuit diagram of an application of the present invention to turn on an optical receiver circuit.

FIG. 3 shows an alternate application of the present invention. FIG. 3 shows the same photodetector 32, responding to incident light 30, sensing circuit and amplifier stage 44, 46 and like elements are indicated with like reference numerals. In the embodiment of FIG. 3, the amplifier stage output of the sensing circuit is connected to a CMOS transistor current source 56 which supplies a stable current, when the photodetector is activated to a CMOS transistor switch 58. The drain of the switch is connected to an optical receiver and amplifier 60 as the power supply input. In FIG. 3, a second photodetector 62 is connected to a signal input of the receiver. The second photodetector produces the high frequency demodulated optical signal that is transmitted to the integrated circuit. The first photodetector is used only to switch on the receiver 60. The first photodetector detects stray or perimeter light that is directed at the second photodetector. As discussed above with respect to FIG. 2, the sensing circuit is a slow response circuit due to the slow transistor 42. Accordingly, the sensing circuit output signal is a low bandwidth signal. The second photodetector, on the contrary, is optimized for high frequency, high bandwidth signal reception and propagation.

As discussed above the optical receiver and amplifier 60, a rudimentary example of which is shown in FIG. 3, can be provided for several different functions. These functions include interconnection with optical communication systems for data transfer, debugging and diagnostics. The high frequency signal may alternatively be an optical clock that is supplied to other high speed or high stability circuitry.

Importantly, while embodiments of the present invention are described with reference to optical communications input/output ports for microprocessors in CMOS VLSI technology, the method and apparatus described herein are equally applicable to turning on and off other types of circuits in other types of integrated circuits. For example, the techniques described herein are thought to be useful in other types of circuitry, for example Bi-CMOS, bipolar transistor circuits, silicon germanium, gallium arsenide and indium phosphide systems. The techniques herein can also be applied, for example to portable devices that have removable connections to fiber optic communication links.

In the above description, for the purposes of explanation, numerous specific details are set forth in order to provide a thorough understanding of the present invention. In other instances, well-known structures and devices are shown in block diagram form. Neither illustration is intended to be limiting in any way. It will be apparent, to one skilled in the art that the present invention may be practiced without some of these specific details and that many father alterations and modifications can be made to the particular embodiments shown above. Accordingly, references to the details of particular embodiments are not intended to limit the scope of the claims but only to illustrate particular examples. The claims alone recite those features considered to be necessary to the invention.

What is claimed is:

1. A large scale integrated circuit (IC) comprising:
   a light sensing device to produce a sense signal in response to sensing light;
   a low power light sensing circuit integrated on the IC substrate coupled to the light sensing device and maintained in an active state to amplify and condition the sense signal;
   an optical modulator integrated on the IC substrate;
   a photodetector independent of the light sensing device, coupled to the optical modulator to provide received optical signals to the modulator for demodulation;
   a diagnostic I/O system integrated on the IC substrate and coupled to the optical modulator to allow optical signals to be used to communicate diagnostic protocols with the IC;
   a switch integrated on the IC substrate connected to the light sensing circuit to receive the sense signal from the light sensing device and to the optical modulator to produce an enable signal to activate the optical modulator from a minimum power disabled state to a powered enabled state when light is sensed by the light sensing device.

2. The circuit of claim 1 wherein the light sensing device is a phototransistor.

3. The circuit of claim 1 wherein the optical modulator is coupled to an optical receiver.

4. The circuit of claim 1 wherein the light sensing circuit comprises a current mirror to detect the sensing signal and an amplifier to amplify the detected sensing signal.

5. The circuit of claim 1 wherein the switch comprises a logic gate coupled to the light sensing device and to an input to the optic function subcircuit to alternately enable and disable an input to the optical modulator.

6. The circuit of claim 1 wherein the switch is connected to couple a power supply to the optical modulator.

7. The circuit of claim 1 wherein the switch is connected to enable a clock input to the optical modulator.

8. A circuit comprising:
   a pn-photodetector integrated on a large scale integrated circuit (IC);
   a light sensing circuit coupled to the photodetector, integrated on the IC substrate and maintained in an active state to amplify and condition the photodetector output signal;
   a switch integrated on the IC substrate coupled to the light sensing circuit to receive the photodetector output signal and produce an enabling signal to allow power to be supplied to an optical modulator integrated on the IC substrate in response to detection of a signal from the light sensing circuit.

9. The circuit of claim 8 wherein the light sensing circuit comprises a current mirror in which one side of the mirror includes the photodetector and the other side of the mirror comprises a slow transistor, the slow transistor having a gate connected to the output of the photodetector.

10. The circuit of claim 8 wherein the switch comprises a gate connected to the optical modulator and to a clock signal of the optical modulator integrated on the IC substrate so that the clock signal is supplied to the optical modulator when the photodetector is activated.

11. The circuit of claim 8 wherein the switch comprises a transistor coupled across the power supply to the optical modulator, the transistor having a gate connected to the amplifier so that the power supply is enabled when the photodetector is activated.

* * * * *

UNITED STATES PATENT AND TRADEMARK OFFICE
CERTIFICATE OF CORRECTION

PATENT NO. : 6,649,898 B1
DATED : November 18, 2003
INVENTOR(S) : Fleischer et al.

It is certified that error appears in the above-identified patent and that said Letters Patent is hereby corrected as shown below:

Column 1,
Line 31, after "scale", insert -- integrated circuit environment --.

Signed and Sealed this

Fourth Day of May, 2004

JON W. DUDAS
*Acting Director of the United States Patent and Trademark Office*